(12) United States Patent
Li et al.

(10) Patent No.: US 8,949,485 B1
(45) Date of Patent: Feb. 3, 2015

(54) ELECTRONIC DEVICE CAPABLE OF SAFELY REMOVING PERIPHERAL DEVICE

(71) Applicant: Wistron Corporation, New Taipei (TW)

(72) Inventors: Hui Li, New Taipei (TW); Ada Wei, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/250,364

(22) Filed: Apr. 10, 2014

(30) Foreign Application Priority Data

Sep. 25, 2013 (CN) .......................... 2013 1 0447477

(51) Int. Cl.
*G06F 11/30* (2006.01)
*G06F 1/16* (2006.01)

(52) U.S. Cl.
CPC .............. *G06F 11/3051* (2013.01); *G06F 1/16* (2013.01); *G06F 1/1601* (2013.01)
USPC .......................................................... 710/18

(58) Field of Classification Search
None
See application file for complete search history.

(56) References Cited

U.S. PATENT DOCUMENTS

| 6,394,813 | B1 * | 5/2002 | Stout et al. ...................... 439/11 |
| 6,418,629 | B1 * | 7/2002 | Oh ................................. 33/1 PT |
| 6,893,267 | B1 * | 5/2005 | Yueh ................................ 439/8 |
| 7,841,100 | B2 * | 11/2010 | Lucke ............................. 33/534 |
| 2007/0045417 | A1 * | 3/2007 | Tsai et al. ..................... 235/441 |

FOREIGN PATENT DOCUMENTS

CN 202231279 5/2012

* cited by examiner

*Primary Examiner* — Elias Mamo
(74) *Attorney, Agent, or Firm* — Winston Hsu; Scott Margo

(57) ABSTRACT

An electronic device capable of safely removing a peripheral device includes a housing; a connecting port rotatably disposed in the housing, the connecting port being used for electrically connecting the peripheral device; an angle detecting unit disposed in the housing and adjacent to the connecting port, the angle detecting unit being used for detecting a rotating angle of the connecting port; and a processing unit disposed in the housing and electrically connected to the connecting port and the angle detecting unit, the processing unit being used for determining whether the peripheral device is in use and determining whether the rotating angle is larger than or equal to a predetermined angle, when the peripheral device is out of use and the rotating angle is larger than or equal to the predetermined angle, the processing unit stopping to identify the peripheral device.

9 Claims, 4 Drawing Sheets

ELECTRONIC DEVICE CAPABLE OF SAFELY REMOVING PERIPHERAL DEVICE

BACKGROUND OF THE INVENTION

1. Field of the Invention

The invention relates to an electronic device capable of safely removing a peripheral device and, more particularly, to an electronic device capable of rapidly and safely removing a peripheral device by rotating a connecting port.

2. Description of the Prior Art

Nowadays, universal serial bus (USB) is the most popular peripheral bus in computer industry and consumer electronic products. USB connecting port can be used to connect various peripheral devices, such as keyboard, mouse, flash driver, card reader, digital camera, personal digital assistant (PDA), smart phone, and so on. Due to plug and play capability and usage convenience, USB is available to most of applications in the market. So far there are lots of USB applications developed by peripheral and computer manufactures and there are also lots of drivers and programs developed correspondingly.

Currently, lots of electronic devices (e.g. personal computer, flat computer, notebook, etc.) are equipped with a plurality of USB connecting ports for connecting different peripheral devices simultaneously. When a user wants to remove one specific peripheral device, he/she has to click a safety removing icon in a toolbar first. Afterward, the names of the peripheral devices, which are connected to the USB connecting ports of the electronic device, will be displayed on the screen. At this time, the user usually has to inquire and check the name of the peripheral device, so as to prevent the other peripheral devices, which are transmitting data, from being removed and then damaged. The aforesaid operation manner is very complicated and inefficient for the user. Furthermore, if the user is not familiar with the name of the peripheral device, it is possible for the user to remove the wrong peripheral device, which is transmitting data and then the peripheral device will be damaged.

SUMMARY OF THE INVENTION

The invention provides an electronic device capable of rapidly and safely removing a peripheral device by rotating a connecting port, so as to solve the aforesaid problems.

According to the claimed invention, an electronic device capable of safely removing a peripheral device comprises a housing; a connecting port rotatably disposed in the housing, the connecting port being used for electrically connecting the peripheral device; an angle detecting unit disposed in the housing and adjacent to the connecting port, the angle detecting unit being used for detecting a rotating angle of the connecting port; and a processing unit disposed in the housing and electrically connected to the connecting port and the angle detecting unit, the processing unit being used for determining whether the peripheral device is in use and determining whether the rotating angle is larger than or equal to a predetermined angle, when the peripheral device is out of use and the rotating angle is larger than or equal to the predetermined angle, the processing unit stopping to identify the peripheral device.

According to the claimed invention, the electronic device further comprises a scale member disposed on the housing and around the connecting port, and the scale member is used for indicating the rotating angle.

According to the claimed invention, the connecting port has an indicator and the angle detecting unit detects the rotating angle of the connecting port through the indicator.

According to the claimed invention, the electronic device further comprises a display unit disposed on the housing and electrically connected to the processing unit, the display unit is used for displaying a setting interface, and the setting interface is used for setting the predetermined angle.

According to the claimed invention, when the peripheral device is in use, the processing unit does not stop to identify the peripheral device no matter whether the rotating angle is larger than or equal to the predetermined angle.

According to the claimed invention, the electronic device further comprises a power supply unit disposed in the housing and electrically connected to the connecting port, wherein after the processing unit stops to identify the peripheral device, the power supply unit is still able to charge the peripheral device through the connecting port.

According to the claimed invention, after the processing unit stops to identify the peripheral device, the processing unit determines whether the peripheral device has been removed from the connecting port within a predetermined time period; and if the peripheral device has not been removed from the connecting port yet within the predetermined time period, the processing unit re-identifies the peripheral device.

According to the claimed invention, when the peripheral device is out of use and the rotating angle is larger than or equal to the predetermined angle, the processing unit stops to identify the peripheral device after a predetermined time period; and if the peripheral device is activated again within the predetermined time period, the processing unit does not stop to identify the peripheral device.

According to the claimed invention, after the processing unit stops to identify the peripheral device, the processing unit determines whether the rotating angle is larger than or equal to the predetermined angle again if the peripheral device has not been removed from the connecting port yet; and when the rotating angle is larger than or equal to the predetermined angle again, the processing unit re-identifies the peripheral device.

According to the claimed invention, the connecting port comprises a casing, a rod member and a resilient member, the casing is rotatably connected to the rod member, and opposite ends of the resilient member are connected to the casing and the rod member.

As mentioned in the above, when a user wants to remove the peripheral device from the connecting port, he/she can rotate the connecting port immediately. When the peripheral device is out of use (i.e. no data is being transmitted) and the rotating angle of the connecting port is larger than or equal to the predetermined angle, the processing unit will stop to identify the peripheral device. The aforesaid predetermined angle can be set by the user in the setting interface. After the processing unit stops to identify the peripheral device, the user can remove the peripheral device from the connecting port accordingly. It should be noted that when the peripheral device is in use, the processing unit does not stop to identify the peripheral device no matter whether the rotating angle is larger than or equal to the predetermined angle, so as to prevent the data being transmitted from being corrupted. Accordingly, the user can rapidly and safely remove the peripheral device by rotating the connecting port.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
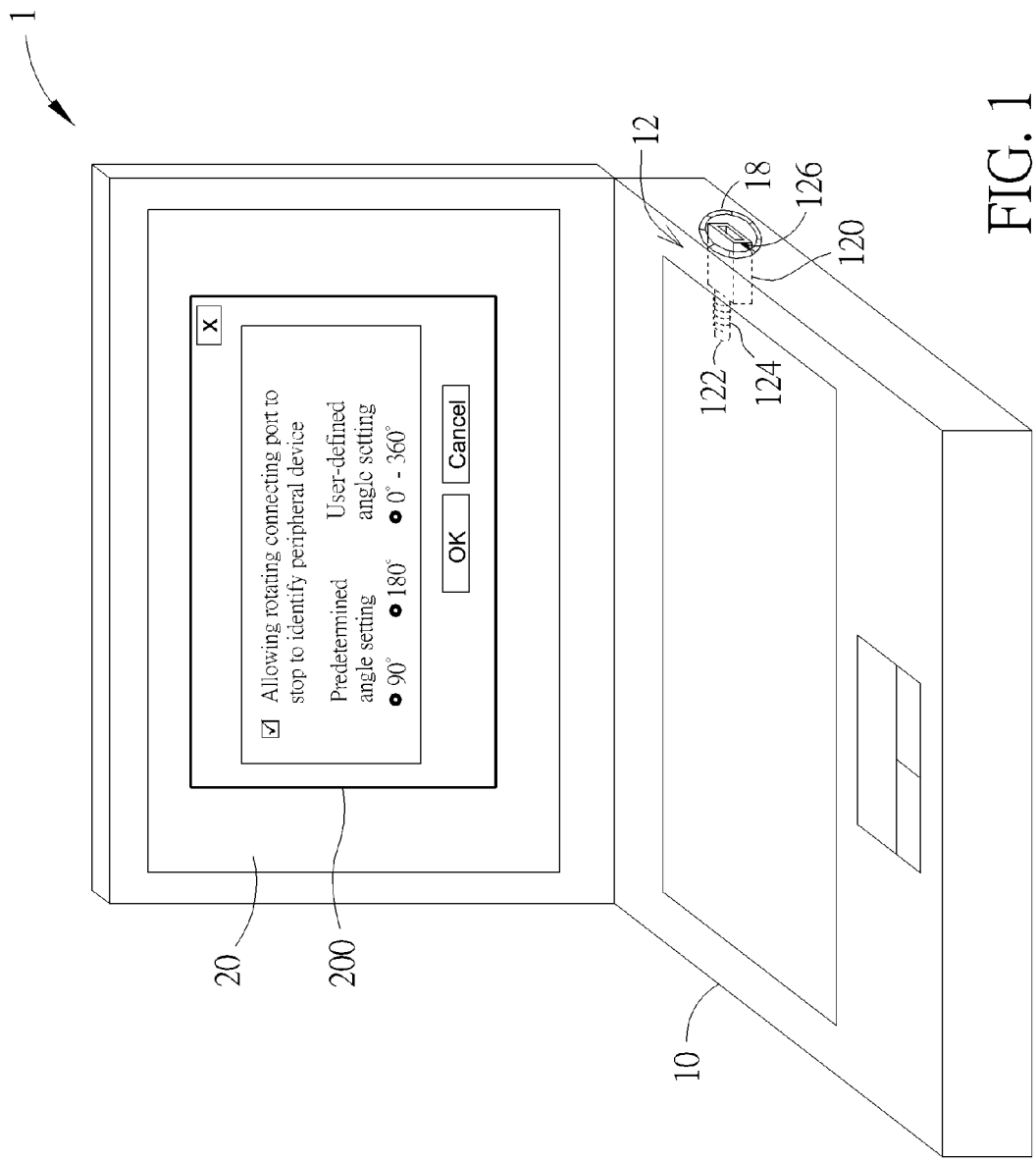
FIG. 1 is a schematic diagram illustrating an electronic device capable of safely removing a peripheral device according to an embodiment of the invention.
Figure 2:
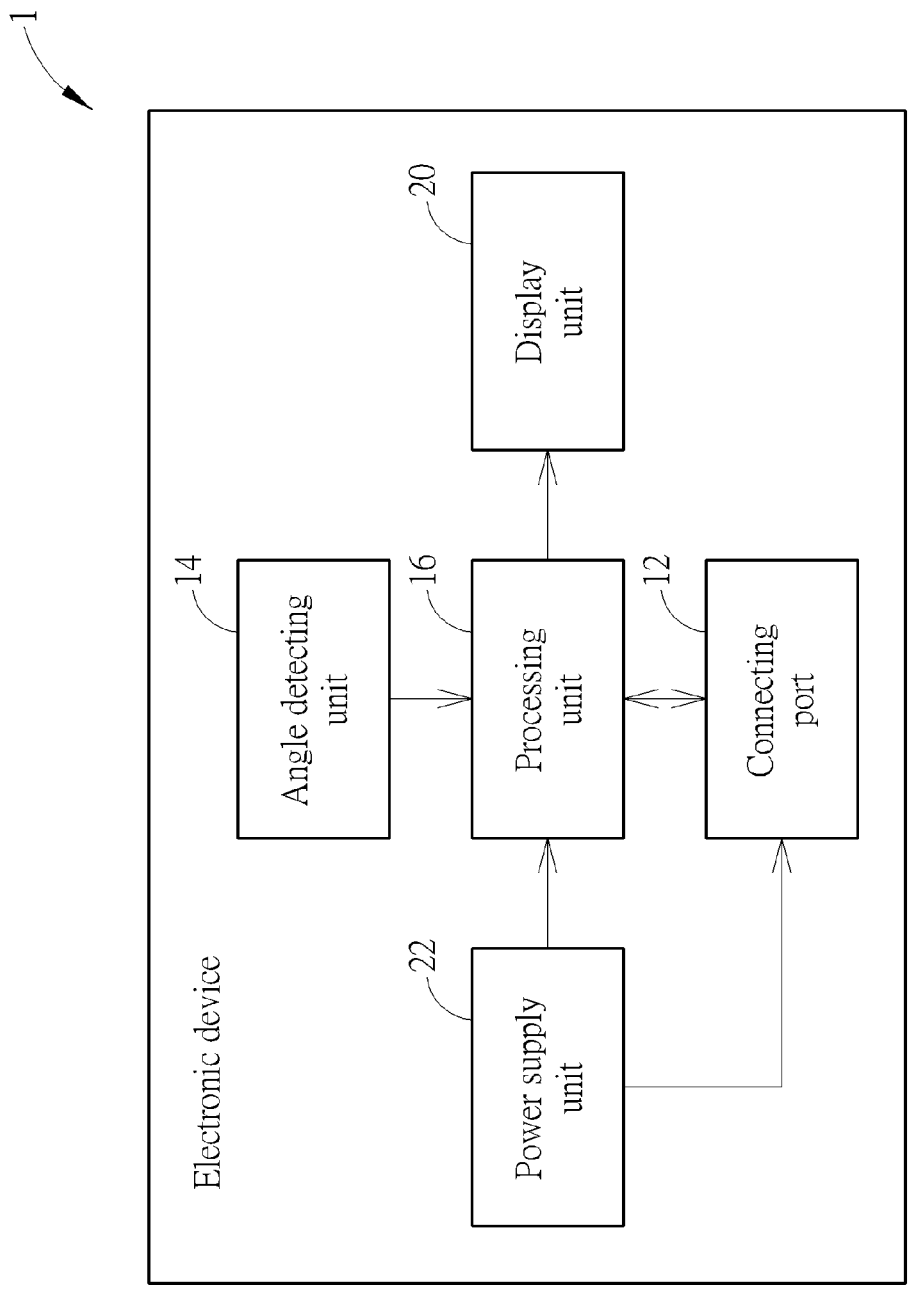
FIG. 2 is functional block diagram illustrating the electronic device shown in FIG. 1.
Figure 3:
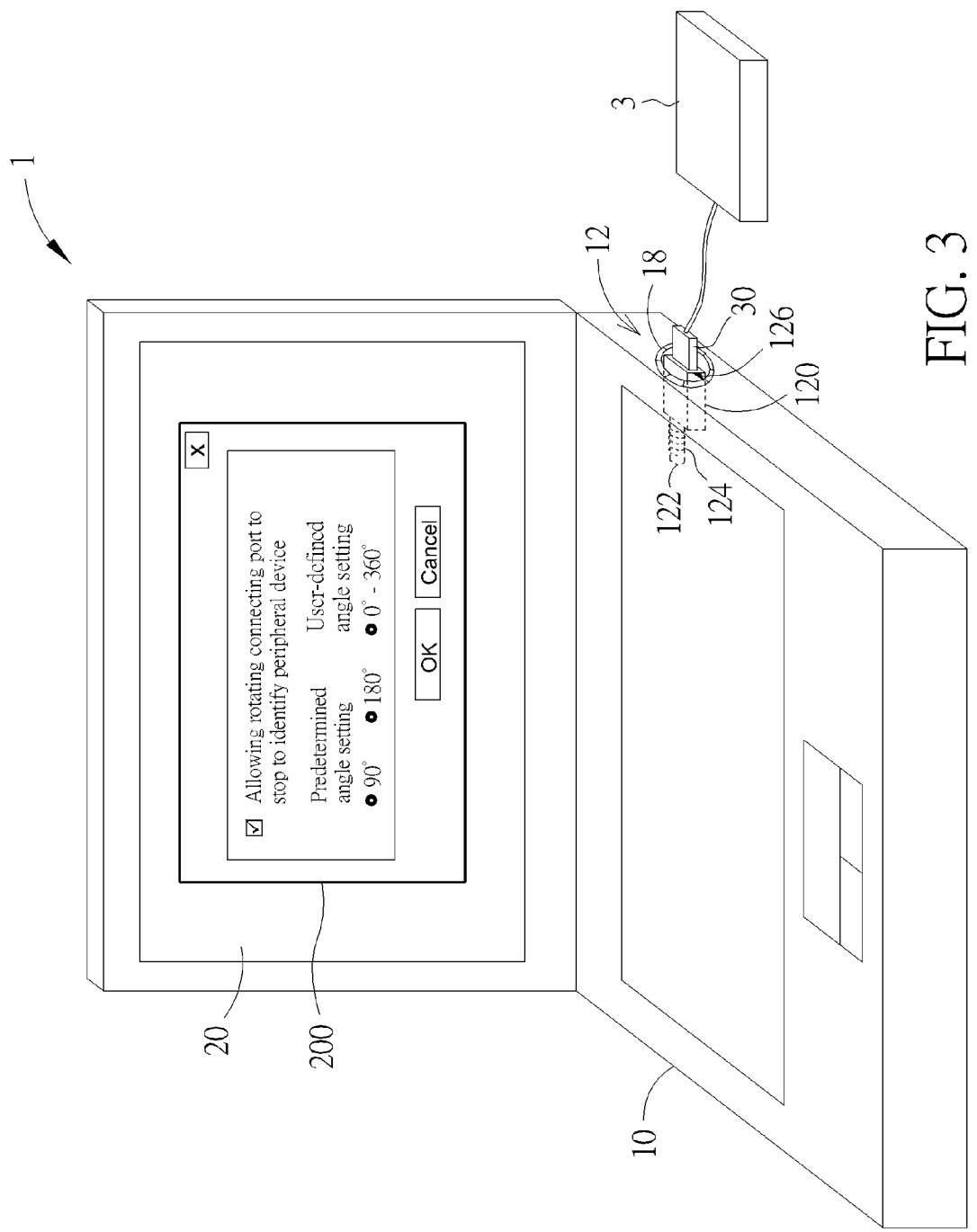
FIG. 3 is a schematic diagram illustrating a peripheral device connected to the connecting port shown in FIG. 1.
Figure 4:
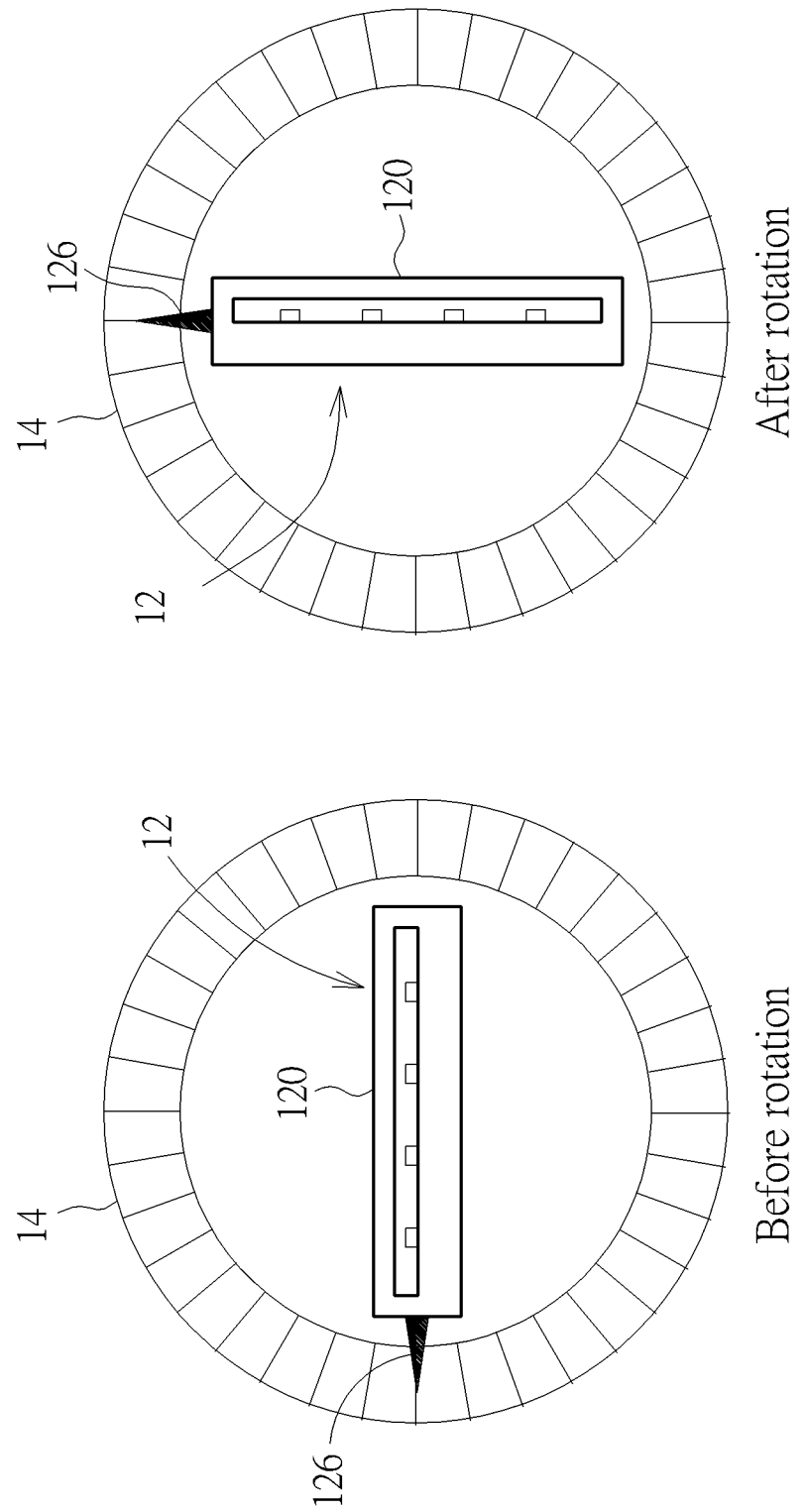
FIG. 4 is a schematic diagram illustrating the connecting port shown in FIG. 1 relative to the angle detecting unit before and after rotation.

Referring to FIGS. 1 to 4, FIG. 1 is a schematic diagram illustrating an electronic device 1 capable of safely removing a peripheral device according to an embodiment of the invention, FIG. 2 is functional block diagram illustrating the electronic device 1 shown in FIG. 1, FIG. 3 is a schematic diagram illustrating a peripheral device 3 connected to the connecting port 12 shown in FIG. 1, and FIG. 4 is a schematic diagram illustrating the connecting port 12 shown in FIG. 1 relative to the angle detecting unit 14 before and after rotation.

As shown in FIGS. 1 to 3, the electronic device 1 comprises a housing 10, a connecting port 12, an angle detecting unit 14, a processing unit 16, a scale member 18, a display unit 20 and a power supply unit 22. The connecting port 12 is rotatably disposed in the housing 10. The connecting port 12 is used for electrically connecting a peripheral device 3. Although there is only one connecting port 12 in this embodiment for illustration purpose, the number of the connecting ports 12 can be determined according to practical applications and is not limited to one. The angle detecting unit 14 is disposed in the housing 10 and adjacent to the connecting port 12. The angle detecting unit 14 is used for detecting a rotating angle of the connecting port 12. The processing unit 16 is disposed in the housing 10 and electrically connected to the connecting port 12, the angle detecting unit 14, the display unit 20 and the power supply unit 22. The scale member 18 is disposed on the housing 10 and around the connecting port 12. The scale member 18 is used for indicating the rotating angle of the connecting port 12. For example, the scale member 18 may be divided into eight scales. When the connecting port 12 rotates from one scale to another scale, the rotating angle of the connecting port 12 is equal to 45 degrees. The display unit 20 is disposed on the housing 10 and electrically connected to the processing unit 16. The power supply unit 22 is disposed in the housing 10 and electrically connected to the connecting port 12.

In practical applications, the electronic device 1 may be a personal computer, tablet computer, notebook computer or other electronic devices with plug and play connecting ports; the connecting port 12 may be a universal serial bus (USB) connecting port or other plug and play connecting ports; the angle detecting unit 14 may be a current-sensing type angle detector, potentiometer type angle detector, optical angle detector or other angle detectors; the processing unit 16 may be a processor or controller with data calculating/processing function; the display unit 20 may be a liquid crystal display device or other display devices; the power supply unit 22 may be a battery or other power supply modules. In general, the electronic device 1 may be further equipped with some necessary hardware or software components for specific purposes, such as a circuit board, an operating system, a communication module, a memory, a data storage device, etc., and it depends on practical applications.

In this embodiment, the connecting port 12 may comprise a casing 120, a rod member 122 and a resilient member 124, as shown in FIG. 1. The electric connecting pads of the connecting port 12 are disposed in the casing 120. The casing 120 is rotatably connected to the rod member 122 and opposite ends of the resilient member 124 are connected to the casing 120 and the rod member 122. The rod member 122 is fixed in the housing 10. The resilient member 124 may be, but not limited to, a torsion spring. When the casing 120 rotates with respect to the rod member 122, the resilient member 124 is twisted. After releasing the casing 120, the twisted resilient member 124 will generate a torque force to drive the casing 120 to return to the original position. In practical applications, the electric connecting pads in the casing 120 may be electrically connected to the circuit board in the housing 10 by a flexible printed circuit board or flexible cable for transmitting signals. Furthermore, one side of the connecting port 12 may have an indicator 126, wherein the angle detecting unit 14 may detect the rotating angle of the connecting port 12 through the indicator 126. In other words, when the connecting port 12 rotates, the angle detecting unit 14 will detect the rotating angle of the connecting port 12 by detecting the position of the indicator 126.

As shown in FIG. 1, the display unit 20 is used for displaying a setting interface 200. In this embodiment, the setting interface 200 is used for setting a predetermined angle and setting whether it is allowed to rotate the connecting port to stop to identify the peripheral device. For example, the user can set the predetermined angle to be 90 degrees, 180 degrees or other random angle values in the setting interface 200. As shown in FIG. 3, a connecting plug 30 of the peripheral device 3 is connected to the connecting port 12 of the electronic device 1 for transmitting signals. When the function of "allowing rotating connecting port to stop to identify peripheral device" is turned on and the user wants to remove the peripheral device 3 from the connecting port 12, the user can rotate the connecting plug 30 of the peripheral device 3 to drive the connecting port 12 to rotate, as shown in FIG. 4. At this time, the angle detecting unit 14 detects the rotating angle of the connecting port 12. After receiving the detected signals from the angle detecting unit 14, the processing unit 16 determines whether the peripheral device 3 is in use and determines whether the rotating angle of the connecting port 12 is larger than or equal to the predetermined angle (e.g. 90 degrees, 180 degrees or other random angle values). When the peripheral device 3 is out of use and the rotating angle of the connecting port 12 is larger than or equal to the predetermined angle, the processing unit 16 will stop to identify the peripheral device 3 (i.e. to cut off the data transmitting path between the peripheral device 3 and the connecting port 12). At this time, the user can safely remove the connecting plug 30 of the peripheral device 3 from the connecting port 12. It should be noted that when the peripheral device 3 is in use, the processing unit 16 will not stop to identify the peripheral device 3 no matter whether the rotating angle of the connecting port 12 is larger than or equal to the predetermined angle, so as to prevent the data being transmitted from being corrupted. Accordingly, the user can rapidly and safely remove the peripheral device 3 by rotating the connecting port 12.

The user can observe whether the rotating angle of the connecting port 12 is larger than or equal to the predetermined angle easily through the scale member 18. Preferably, the invention may enable the connecting port 12 to rotate clockwise or counterclockwise only, so as to avoid confusion of the rotating angle in different directions and simplify operation.

In this embodiment, after the processing unit 16 stops to identify the peripheral device 3, the power supply unit 22 is still able to charge the peripheral device 3 through the connecting port 12 if the peripheral device 3 has not been removed from the connecting port 12 yet. In other words, after the processing unit 16 stops to identify the peripheral device 3, the processing unit 16 may only cut off the data transmitting path between the peripheral device 3 and the connecting port 12 without cutting off the charging path between the peripheral device 3 and the connecting port 12. It is needless to say that after the processing unit 16 stops to identify the peripheral device 3, the processing unit 16 may cut off the data transmitting path and the charging path between the peripheral device 3 and the connecting port 12 simultaneously.

In this embodiment, after the processing unit 16 stops to identify the peripheral device 3, the processing unit 16 may further determine whether the peripheral device 3 has been removed from the connecting port 12 within a predetermined time period (e.g. 15 minutes, 30 minutes or other random time periods). If the peripheral device 3 has not been removed from the connecting port 12 yet within the predetermined time period, the processing unit 16 will re-identify the peripheral device 3. Accordingly, when the user wants to use the peripheral device 3 to transmit data again after the aforesaid predetermined time period, he/she needs not to remove the peripheral device 3 from the connecting port 12 and reconnect the peripheral device 3 to the connecting port 12. It is very convenient for the user.

In this embodiment, when the peripheral device 3 is out of use and the rotating angle of the connecting port 12 is larger than or equal to the predetermined angle, the processing unit 16 may stop to identify the peripheral device 3 after a predetermined time period (e.g. 15 minutes, 30 minutes or other random time periods). If the peripheral device 3 is activated again within the predetermined time period, the processing unit 16 will not stop to identify the peripheral device 3. In other words, after rotating the connecting port 12 with a rotating angle larger than or equal to the predetermined angle, the user still can use the peripheral device 3 to transmit data since the process unit 16 does not stop to identify the peripheral device 3 immediately.

In this embodiment, after the processing unit 16 stops to identify the peripheral device 3, the processing unit 16 may determine whether the rotating angle of the connecting port 12 is larger than or equal to the predetermined angle again if the peripheral device 3 has not been removed from the connecting port 12 yet. When the rotating angle of the connecting port 12 is larger than or equal to the predetermined angle again, the processing unit 16 will re-identify the peripheral device 3. In other words, if the user wants to use the peripheral device 3 to transmit data after rotating the connecting port 12 with a rotating angle larger than or equal to the predetermined angle, he/she only needs to rotate the connecting port 12 with a rotating angle larger than or equal to the predetermined angle again, such that the processing unit 16 will re-identify the peripheral device 3. That is to say, the user needs not to remove the peripheral device 3 from the connecting port 12 and reconnect the peripheral device 3 to the connecting port 12.

As mentioned in the above, when a user wants to remove the peripheral device from the connecting port, he/she can rotate the connecting port immediately. When the peripheral device is out of use (i.e. no data is being transmitted) and the rotating angle of the connecting port is larger than or equal to the predetermined angle, the processing unit will stop to identify the peripheral device. The aforesaid predetermined angle can be set by the user in the setting interface. After the processing unit stops to identify the peripheral device, the user can remove the peripheral device from the connecting port accordingly. It should be noted that when the peripheral device is in use, the processing unit does not stop to identify the peripheral device no matter whether the rotating angle is larger than or equal to the predetermined angle, so as to prevent the data being transmitted from being corrupted. Accordingly, the user can rapidly and safely remove the peripheral device by rotating the connecting port.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device capable of safely removing a peripheral device comprising:
   a housing;
   a connecting port rotatably disposed in the housing, the connecting port configured to electrically connect the peripheral device;
   an angle detecting unit disposed in the housing and adjacent to the connecting port, the angle detecting unit configured to detect a rotating angle of the connecting port;
   a processing unit disposed in the housing and electrically connected to the connecting port and the angle detecting unit, the processing unit configured to determine whether the peripheral device is in use and determining whether the rotating angle is larger than or equal to a predetermined angle, when the peripheral device is out of use and the rotating angle is larger than or equal to the predetermined angle, the processing unit stopping to identify the peripheral device; and
   a display unit disposed on the housing and electrically connected to the processing unit, the display unit configured to display a setting interface, the setting interface configured to detect the predetermined angle.

2. The electronic device of claim 1, further comprising a scale member disposed on the housing and around the connecting port, the scale member configured to indicate the rotating angle.

3. The electronic device of claim 1, wherein the connecting port has an indicator and the angle detecting unit detects the rotating angle of the connecting port through the indicator.

4. The electronic device of claim 1, wherein when the peripheral device is in use, the processing unit does not stop to identify the peripheral device no matter whether the rotating angle is larger than or equal to the predetermined angle.

5. The electronic device of claim 1, further comprising a power supply unit disposed in the housing and electrically connected to the connecting port, wherein after the processing unit stops to identify the peripheral device, the power supply unit is still able to charge the peripheral device through the connecting port if the peripheral device has not been removed from the connecting port yet.

6. The electronic device of claim 1, wherein after the processing unit stops to identify the peripheral device, the processing unit determines whether the peripheral device has been removed from the connecting port within a predetermined time period; and if the peripheral device has not been removed from the connecting port yet within the predetermined time period, the processing unit re-identifies the peripheral device.

7. The electronic device of claim 1, wherein when the peripheral device is out of use and the rotating angle is larger than or equal to the predetermined angle, the processing unit stops to identify the peripheral device after a predetermined time period; and if the peripheral device is activated again within the predetermined time period, the processing unit does not stop to identify the peripheral device.

8. The electronic device of claim 1, wherein after the processing unit stops to identify the peripheral device, the processing unit determines whether the rotating angle is larger than or equal to the predetermined angle again if the peripheral device has not been removed from the connecting port yet; and when the rotating angle is larger than or equal to the predetermined angle again, the processing unit re-identifies the peripheral device.

9. The electronic device of claim 1, wherein the connecting port comprises a casing, a rod member and a resilient member, the casing is rotatably connected to the rod member, and opposite ends of the resilient member are connected to the casing and the rod member.

* * * * *